(12) United States Patent
Hao et al.

(10) Patent No.: US 11,568,198 B2
(45) Date of Patent: Jan. 31, 2023

(54) DEEP AUTO-ENCODER FOR EQUIPMENT HEALTH MONITORING AND FAULT DETECTION IN SEMICONDUCTOR AND DISPLAY PROCESS EQUIPMENT TOOLS

(71) Applicant: Applied Materials, Inc., Santa Clara, CA (US)

(72) Inventors: Heng Hao, Fremont, CA (US); Sreekar Bhaviripudi, Sunnyvale, CA (US); Shreekant Gayaka, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 760 days.

(21) Appl. No.: 16/545,908

(22) Filed: Aug. 20, 2019

(65) Prior Publication Data

US 2020/0082245 A1 Mar. 12, 2020

Related U.S. Application Data

(60) Provisional application No. 62/730,477, filed on Sep. 12, 2018.

(51) Int. Cl.
*G06K 9/00* (2022.01)
*G06N 3/04* (2006.01)
(Continued)

(52) U.S. Cl.
CPC ........... *G06N 3/04* (2013.01); *G05B 19/4189* (2013.01); *G06N 3/08* (2013.01); *G06V 10/82* (2022.01);
(Continued)

(58) Field of Classification Search
CPC .................................................. G05B 19/4189
See application file for complete search history.

(56) References Cited

U.S. PATENT DOCUMENTS

| 6,521,080 B2 | 2/2003 | Balasubramhanya et al. |
| 6,763,130 B1 | 7/2004 | Somekh et al. |
| | (Continued) | |

FOREIGN PATENT DOCUMENTS

| CN | 102160164 A | 8/2011 |
| JP | 06-150178 | 5/1994 |
| | (Continued) | |

OTHER PUBLICATIONS

International Search Report and Written Opinion dated Dec. 6, 2019 for Application No. PCT/US2019/047267.
(Continued)

*Primary Examiner* — Hadi Akhavannik
(74) *Attorney, Agent, or Firm* — Patterson & Sheridan, LLP

(57) ABSTRACT

Implementations described herein generally relate to a method for detecting anomalies in time-series traces received from sensors of manufacturing tools. A server feeds a set of training time-series traces to a neural network configured to derive a model of the training time-series traces that minimizes reconstruction error of the training time-series traces. The server extracts a set of input time-series traces from one or more sensors associated with one or more manufacturing tools configured to produce a silicon substrate. The server feeds the set of input time-series traces to the trained neural network to produce a set of output time series traces reconstructed based on the model. The server calculates a mean square error between a first input time series trace of the set of input time series traces and a corresponding first output time series trace of the set of output time-series traces. The server declares the sensor corresponding to the first input time-series trace as having an anomaly when the mean square error exceeds a pre-determined value.

21 Claims, 7 Drawing Sheets

(51) Int. Cl.
*G06N 3/08* (2006.01)
*G05B 19/418* (2006.01)
*G06V 10/82* (2022.01)

(52) U.S. Cl.
CPC .............. *G05B 2219/32335* (2013.01); *G05B 2219/45031* (2013.01)

(56) References Cited

U.S. PATENT DOCUMENTS

| | | | |
|---|---|---|---|
| 7,356,377 B2 | 4/2008 | Schwarm | |
| 9,990,687 B1* | 6/2018 | Kaufhold | G06K 9/6247 |
| 11,133,204 B2* | 9/2021 | Hao | H01J 37/32889 |
| 2005/0171627 A1 | 8/2005 | Funk et al. | |
| 2005/0187649 A1 | 8/2005 | Funk et al. | |
| 2005/0288812 A1 | 12/2005 | Cheng et al. | |
| 2007/0100487 A1* | 5/2007 | Cheng | G05B 19/41875 |
| | | | 700/51 |
| 2013/0077893 A1* | 3/2013 | Moon | G06T 15/06 |
| | | | 382/299 |
| 2015/0227849 A1* | 8/2015 | Jaros | G06N 20/00 |
| | | | 706/12 |
| 2016/0139977 A1* | 5/2016 | Ashani | G06N 3/08 |
| | | | 714/26 |
| 2016/0350952 A1* | 12/2016 | Rolland | G01J 3/18 |
| 2017/0077002 A1 | 3/2017 | Singlevich et al. | |
| 2017/0177997 A1 | 6/2017 | Karlinsky et al. | |
| 2017/0181689 A1* | 6/2017 | Lin | A61B 5/1107 |
| 2017/0188938 A1* | 7/2017 | Toh | H04W 4/38 |
| 2017/0285605 A1 | 10/2017 | Iyer et al. | |

FOREIGN PATENT DOCUMENTS

| | | |
|---|---|---|
| TW | 200629117 A | 8/2006 |
| TW | 200712812 A | 4/2007 |
| TW | 200828478 A | 7/2008 |
| TW | 200943012 A | 10/2009 |
| TW | 200951752 A | 12/2009 |
| TW | 201711089 A | 3/2017 |
| WO | 2017/210455 A1 | 12/2017 |

OTHER PUBLICATIONS

Office Action from Taiwanese Patent Application No. 108132666 dated Dec. 2, 2021.

* cited by examiner

DEEP AUTO-ENCODER FOR EQUIPMENT HEALTH MONITORING AND FAULT DETECTION IN SEMICONDUCTOR AND DISPLAY PROCESS EQUIPMENT TOOLS

CROSS-REFERENCE TO RELATED APPLICATIONS

This application claims benefit of U.S. Provisional Patent Application Ser. No. 62/730,477, filed Sep. 12, 2018, which application is hereby incorporated by reference herein.

BACKGROUND

Field

Implementations described herein generally relate to analyzing time-series traces to detect anomalies in sensors employed in one or more semiconductor processing chambers.

Description of the Related Art

Manufacturing silicon substrates involves a series of different processing operations that may be performed in a single processing system or "tool" which includes a plurality of processing chambers. During processing, each chamber in which a procedure is carried out may include a plurality of sensors, with each sensor configured to monitor a predefined metric relating to substrate processing.

Further, these multiple silicon substrate processing operations occur over an interval of time. A process may include a transition from a first operation to a second operation. Time-series data is data collected over the interval of time, including the transition (e.g., the time-series transition) called time-series traces. Equipment Health Monitoring (EHM) and Fault Detection (FD) techniques for semiconductor/display manufacturing equipment are needed for smoothly running device fabrication facilities. Efforts-to-date for EHM and FD are focused largely on classical machine learning efforts using time-series traces of sensors, which require significant feature engineering by domain experts. These techniques also suffer from overfitting, higher false positive rates and not automated in several cases. Traditional machine learning methods using feature engineering to produce models of time-series traces are also restricted to certain tool types or recipe types. Accordingly whenever a recipe or chamber changes, one needs to rebuild the model which is very time consuming.

Statistical methods cannot detect short-time signal perturbations in data received from sensors over time. Statistical methods also provide false positives (e.g., that an entire signal does not match a target signal because a minimal portion of the signal is outside of a guard band) and do not allow for adjustment of the sensitivity of outlier detection.

Therefore, there is a continual need for an improved method of detecting outliers/anomalies in sensor data retrieved during semiconductor processing.

SUMMARY

A method for detecting anomalies in time-series traces received from sensors of manufacturing tools is disclosed. In one implementation, a server feeds a set of training time-series traces to a neural network configured to derive a model of the training time-series traces that minimizes reconstruction error of the training time-series traces. The server extracts a set of input time-series traces from one or more sensors associated with one or more manufacturing tools configured to produce a silicon substrate. The server feeds the set of input time-series traces to the trained neural network to produce a set of output time series traces reconstructed based on the model. The server calculates a mean square error between a first input time series trace of the set of input time series traces and a corresponding first output time series trace of the set of output time-series traces. The server declares the sensor corresponding to the first input time-series trace as having an anomaly when the mean square error exceeds a pre-determined value.

In another implementation, a computer system is provided, which comprises a memory and a processor configured to perform a method for detecting anomalies in time-series traces received from sensors of manufacturing tools, the method includes feeding a set of training time-series traces to a neural network configured to derive a model of the training time-series traces that minimizes reconstruction error of the training time-series traces. The method further includes extracting a set of input time-series traces from one or more sensors associated with one or more manufacturing tools configured to produce a silicon substrate. The method further includes feeding the set of input time-series traces to the trained neural network to produce a set of output time series traces reconstructed based on the model. The method further includes calculating a mean square error between a first input time series trace of the set of input time series traces and a corresponding first output time series trace of the set of output time-series traces. The method further includes declaring the sensor corresponding to the first input time-series trace as having an anomaly when the mean square error exceeds a pre-determined value.

In yet another implementation, a non-transitory computer-readable medium is provided, which comprises instructions to perform a method for detecting anomalies in time-series traces received from sensors of manufacturing tools. In one embodiment, the method includes feeding a set of training time-series traces to a neural network configured to derive a model of the training time-series traces that minimizes reconstruction error of the training time-series traces. The method further includes extracting a set of input time-series traces from one or more sensors associated with one or more manufacturing tools configured to produce a silicon substrate. The method further includes feeding the set of input time-series traces to the trained neural network to produce a set of output time series traces reconstructed based on the model. The method further includes calculating a mean square error between a first input time series trace of the set of input time series traces and a corresponding first output time series trace of the set of output time-series traces. The method further includes declaring the sensor corresponding to the first input time-series trace as having an anomaly when the mean square error exceeds a pre-determined value.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1:
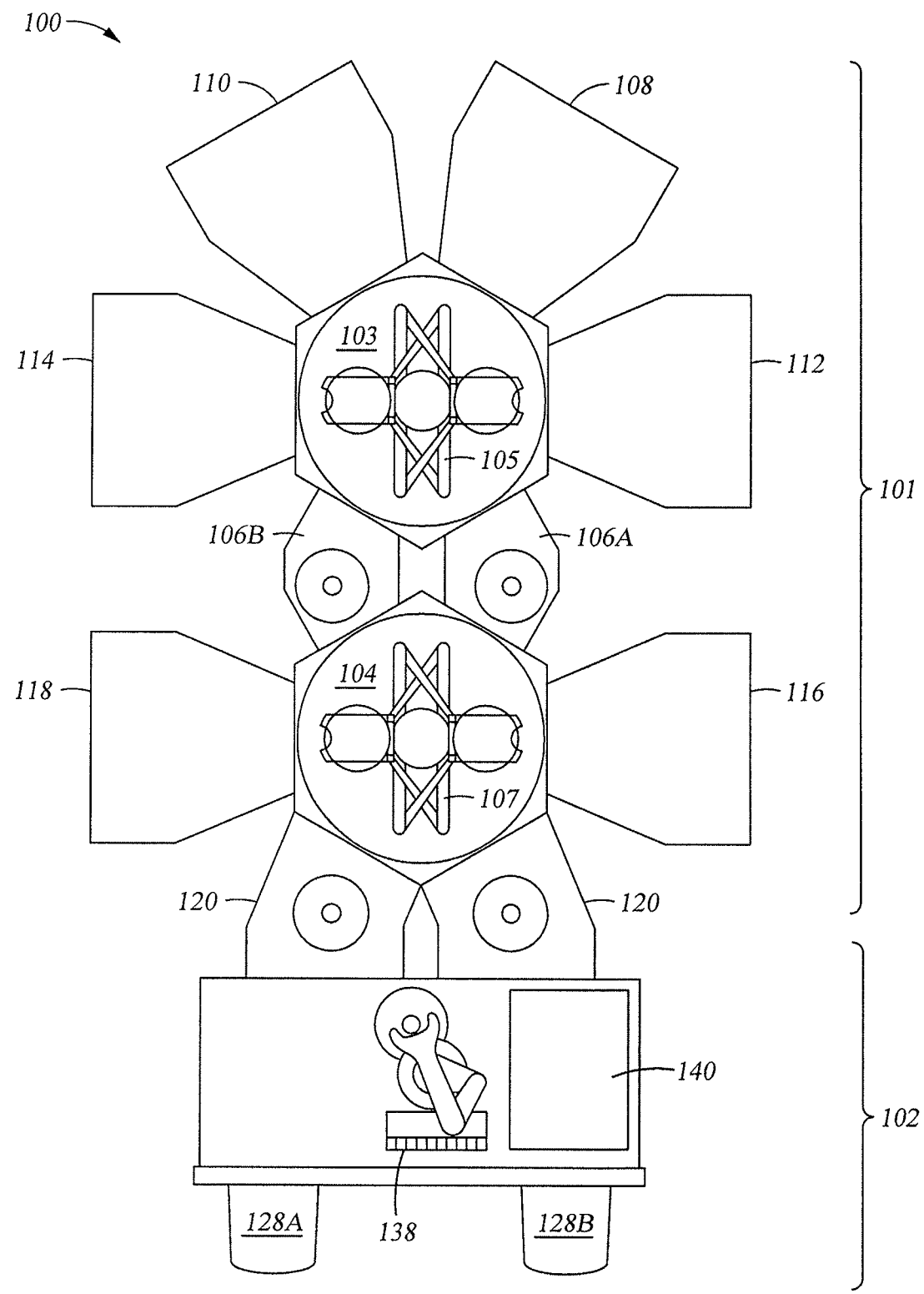
FIG. 1 schematically illustrates a plurality of manufacturing tools for substrate processing, in accordance with one embodiment of the present disclosure.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes method for detecting anomalies in time-series data received from a plurality of sensors of the manufacturing tools. Certain details are set forth in the following description and in FIGS. 1-7 to provide a thorough understanding of various implementations of the disclosure. Other details describing well-known structures and systems often associated with plasma etching are not set forth in the following disclosure to avoid unnecessarily obscuring the description of the various implementations.

Many of the details, dimensions, components, and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

As processes (e.g., manufacturing processes) include shorter operation times, smaller parts, tighter tolerances, and so forth, transitions (e.g., how to get from operation A to operation B in a manufacturing process) become more critical. Problems may occur if a process overshoots or undershoots a transition (e.g., transition from 10 degrees to 20 degrees too fast, transition from 10 degrees to 20 degrees too slow, etc.). Repeatable performance includes consistent transitions. Conventional monitoring methods (e.g., SPC, EHM, FDC) are not capable of monitoring transient time-series and cannot detect short-time signal perturbations in data received from sensors over time (referred to herein as time-series traces). These short anomalies can cause defects (e.g., on-substrate defects) or reduce yield.

Time-series anomaly analysis provides the ability to monitor time-series anomalies in process sensor time-series traces. Time-series anomaly analysis may detect rare, strange, and/or unexpected sequences (e.g., shape, magnitude, position, etc. of a curve of the time-series data (value plotted against sample)) that are undetectable via conventional methods. In one embodiment, the monitoring of anomalies in time-series data is performed by a deep auto-encoder type neural network that derives a model of training time-series traces that minimizes reconstruction error of the training time-series traces. A set of input time-series traces from one or more sensors associated with one or more manufacturing tools configured to produce a silicon substrate is fed to the trained neural network to produce a set of output time series traces reconstructed based on the model. A mean square error difference between each of the one or more output time-series traces and corresponding one or more input time-series traces is calculated and one or more sensors corresponding to the one or more input time-series traces is declared as having an anomaly when the corresponding mean square error difference exceeds a pre-determined value. In one example, the pre-determined value may be set to the mean plus three sigma of the training reconstruction mean squared error as the cutoff.

In semiconductor processing, multi-layered features are fabricated on semiconductor substrates using specific processing recipes having many processing operations. A cluster tool, which integrates a number of process chambers to perform a process sequence without removing substrates from a processing environment (e.g., a controlled environment) is generally used in processing semiconductor substrates. A process sequence is generally defined as the sequence of device fabrication operations, or process recipe operations, completed in one or more processing chambers in a cluster tool. A process sequence may generally contain various substrate electronic device fabrication processing operations.

In semiconductor fabrication, each operation must be performed with a sufficient level of precision so that the resulting device functions correctly. Certain defects which occur during the lithography, etching, deposition, or planarization operations may require significant corrective actions in order to rework the substrate. For example, if a substantial misalignment occurs during lithography, in certain cases the substrate must be stripped and lithography must be redone in order to correct the defect. Correcting these defects may result in substantial increases in time and cost. Various parameters of the substrates (e.g., thickness, optical reflective index, absorption index, strength, critical dimension variation across the substrate, and the like) may need to be within acceptable process windows in order for the completed substrate to be of sufficient quality for use. Problems with one or more parameters and the sensors that measure these parameters may require corrective action to be taken with respect to either an individual substrate or aspects of the manufacturing process. Checking all of these parameters for every substrate after the manufacturing process is complete is inefficient and costly. Sometimes, a representative sample of substrates is checked using metrology tools which measure various parameters of the substrates. Because only a representative sample is checked, however, this method of determining the quality of large numbers of substrates can be inaccurate. Therefore, there is a need for a more systematic and efficient way to determine the quality of a large number of manufactured substrates.

Embodiments of the present disclosure involve monitoring and analysis of process anomalies in time-series data from a plurality of sensors located in a plurality of manufacturing tools of semi-conductor processing equipment. In one implementation, a server extracts a plurality of time-series traces from a plurality of sensors associated with one or more manufacturing tools configured to produce a silicon substrate. The server employs a deep auto-encoder type neural network that is trained to derive a model of input training time-series traces that minimizes reconstruction error of the input training time-series traces. The server feeds the set of input time-series traces to the trained neural network to produce a set of output time series traces reconstructed based on the model. The server calculates a mean square error between a first input time series trace of the set of input time series traces and a corresponding first output time series trace of the set of output time-series traces. The server declares the sensor corresponding to the first input time-series trace as having an anomaly when the mean square error exceeds a pre-determined value. In one example, the pre-determined value may be set to the mean plus three sigma of the training reconstruction mean squared error as the cutoff. The server may instruct a manufacturing system to take corrective action to remove a source of the anomaly.

Embodiments of the present disclosure may allow for efficient and accurate predictions about substrate quality and yield. Furthermore, embodiments may allow for effective determinations to be made regarding improvements with respect to such processes as thin film deposition, etching, and implant processes in order to achieve predictable process windows and optimal thin film properties.

FIG. 1 schematically illustrates one or more manufacturing tools 101 for substrate processing, in accordance with one embodiment of the present disclosure. It is contemplated that the method described herein may be practiced in other tools configured to perform a process sequence. For example, the manufacturing tools 101 embodied in FIG. 1 is the ENDURA® cluster tool commercially available from Applied Materials, Inc. in Santa Clara, Calif.

The manufacturing tools 101 include a vacuum-tight set of manufacturing tools 101 and a factory interface 102. The manufacturing tools 101 comprise a plurality of processing chambers 110, 108, 114, 112, 118, 116. The factory interface 102 is coupled to transfer chamber 104 by the load lock chamber 120.

In one embodiment, the factory interface 202 comprises at least one docking station, at least one substrate transfer end effector 138, and at least one substrate aligner 140. The docking station is configured to accept one or more front opening unified pods 128 (FOUP). Two FOUPs 128A, 128B are shown in the embodiment of FIG. 1. The substrate transfer end effector 138 is configured to transfer the substrate from the factory interface 102 to the load lock chamber 120.

The load lock chamber 120 has a first port coupled to the factory interface 102 and a second port coupled to a first transfer chamber 104. The load lock chamber 120 is coupled to a pressure control system which pumps down and vents the chamber 120 as needed to facilitate passing the substrate between the vacuum environment of the transfer chamber 104 and the substantially ambient (e.g., atmospheric) environment of the factory interface 102.

The first transfer chamber 104 and the second transfer chamber 103 respectively have a first end effector 107 and a second end effector 105 disposed therein. Two substrate transfer platforms 106A, 106B are disposed in the transfer chamber 104 to facilitate transfer of the substrate between end effectors 105, 107. The platforms 106A, 106B can either be open to the transfer chambers 103, 104 or be selectively isolated (i.e., sealed) from the transfer chambers 103, 104 to allow different operational pressures to be maintained in each of the transfer chambers 103, 104.

The end effector 107 disposed in the first transfer chamber 104 is capable of transferring substrates between the load lock chamber 120, the processing chambers 116, 118, and the substrate transfer platforms 106A, 106B. The end effector 105 disposed in the second transfer chamber 103 is capable of transferring substrates between the substrate transfer platforms 106A, 106B and the processing chambers 112, 114, 110, 108.

Embodiments of the present disclosure involve gathering and analyzing data from sensors associated with various processes of substrates during the manufacturing process from various manufacturing tools 101 in order to detect and possibly eliminate anomalies. In some embodiments, the manufacturing tools are associated with a manufacturing execution system (MES). The data may include, for example, time-series traces of various sensors. The data may be aggregated and analyzed at a central location, such as a server, and used to detect anomalies/anomalies in real-time. For example, the server may employ a deep auto-encoder type neural network that is trained to derive a model of input training time-series traces that minimizes reconstruction error of the input training time-series traces. The server may feed the set of input time-series traces to the trained neural network to produce a set of output time series traces reconstructed based on the model. The server may calculate a mean square error between a first input time series trace of the set of input time series traces and a corresponding first output time series trace of the set of output time-series traces. The server may declare the sensor corresponding to the first input time-series trace as having an anomaly when the mean square error exceeds a pre-determined value. The server may instruct a manufacturing system (MES) to take corrective action to remove a source of the anomaly.

The anomaly and trace information may be provided from the server to the MES that can be analyzed by engineers and so that corrective action may be taken as needed regarding problems which are identified as a result of detected anomalies. The server may also determine appropriate corrective action to be taken based on analysis of the data (e.g., based on identifying correlations between time-series traces of sensors and metrology data taken from other sensors that measure parameters of a substrate), and provide instructions to perform corrective action. In some embodiments, the MES may automatically take corrective action (e.g., recalibrating or adjusting a parameter of a lithography tool, redoing a portion of the manufacturing process for a substrate, or other suitable computing device) based on the predictive information. In certain embodiments, if the predictive information identifies a problem with one or more parameters of a substrate, the problem may be verified by analyzing the substrate (e.g., using metrology tools). If the problem is confirmed by analyzing the substrate, corrective action may then be taken (e.g., manually or automatically by the MES).

Figure 2:
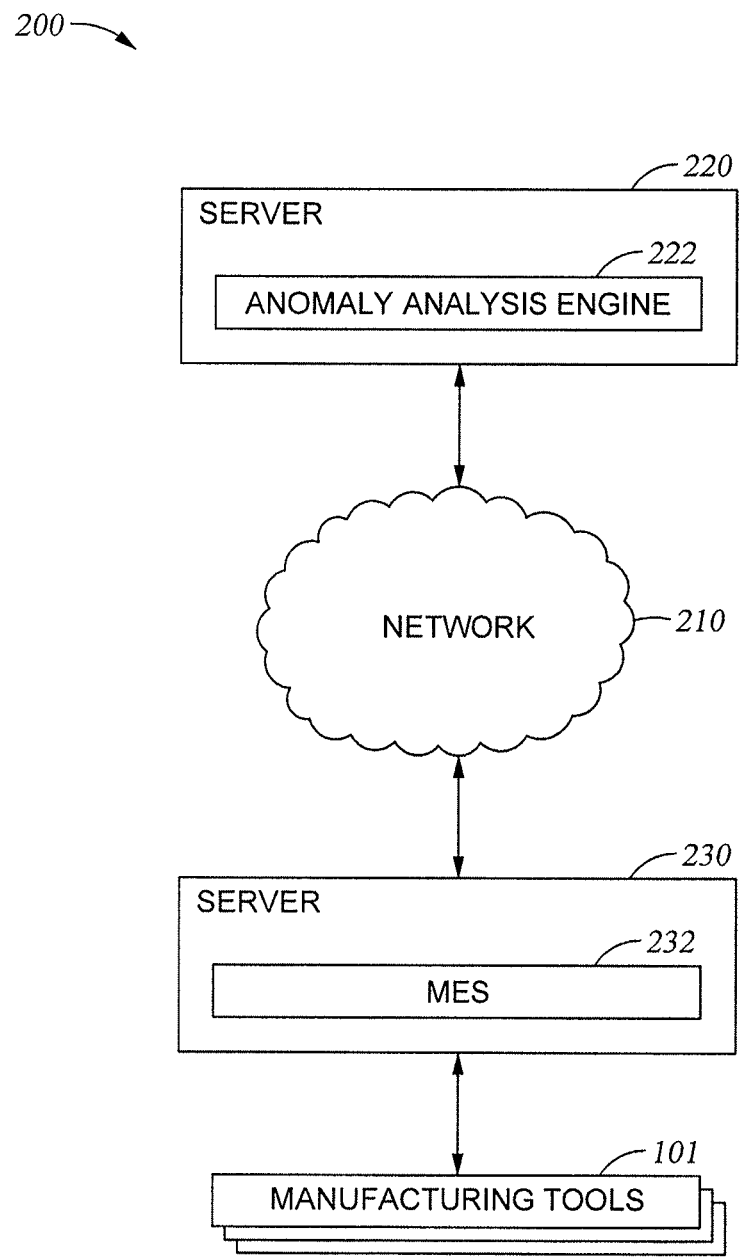
FIG. 2 depicts a network environment in which embodiments of the present disclosure may be implemented.

FIG. 2 depicts a network environment 200 in which embodiments of the present disclosure may be implemented. As shown, network environment 200 includes a server 220 which is connected via network 210 to another server 230 which is connected to one or more manufacturing tools 101. Network 210 may, for example, comprise the Internet. In another embodiment, manufacturing tools 101 manufacturing tools 101 is also connected directly to server 220.

Server 220 may comprise a computing device such as a rack server, desktop or laptop computer, mobile phone, tablet, or other suitable computing device. As shown, server 220 comprises an anomaly analysis engine 222, which may perform operations described herein related to making determinations and predictions regarding identifying and correcting anomalies. The anomaly analysis engine 222 identifies data sources 206A-N (e.g., sensors) that define a system and/or that are used to monitor a system, such as the collection of manufacturing tools 101 corresponding to manufacturing tools 101. The manufacturing tools 101 may be semiconductor processing equipment, such as one or more of a chamber for an etch reactor, a deposition chamber, and so on, corresponding to the platform 101 comprises the plurality of processing chambers 110, 108, 114, 112, 118, 116, of FIG. 1.

For example, anomaly analysis engine 222 may analyze time-series sensor information received from MES 232 or directly from the manufacturing tools 101 in order to detect, analyze, and verify anomalies.

For example, the anomaly analysis engine 222 may analyze process and substrate sensor information received from MES 232 or directly from sensors applied within the manufacturing tools 101 in order to detect anomalies, corrective actions to eliminate future anomalies in the same sensors, and process improvements. In some embodiments, the server 220 is separate from the manufacturing tools 101. In other embodiments, the server may be part of the manufacturing tools 101 or may be an off-line server.

For example the anomaly analysis engine 222 may receive time-series sensor traces from MES 232 representing temperature, gas flow, or RF power current, etc. collected from a plurality of sensors associated with one or more manufacturing tools configured to produce a silicon substrate. The anomaly analysis engine 222 may employ a deep auto-encoder type neural network that is trained to derive a model of input training time-series traces that minimizes reconstruction error of the input training time-series traces. The anomaly analysis engine 222 may feed the set of input time-series traces to the trained neural network to produce a set of output time series traces reconstructed based on the model. The anomaly analysis engine 222 may calculate a mean square error between a first input time series trace of the set of input time series traces and a corresponding first output time series trace of the set of output time-series traces. The anomaly analysis engine 222 may declare the sensor corresponding to the first input time-series trace as having an anomaly when the mean square error exceeds a pre-determined value. In one example, the pre-determined value may be set to the mean plus three sigma of the training reconstruction mean squared error as the cutoff. The anomaly analysis engine 222 may instruct a manufacturing system (MES) to take corrective action to remove a source of the anomaly.

The anomaly analysis engine 222 may provide predictive information to MES 232 about future anomalies in the sensor data. In some embodiments, the anomaly analysis engine 222 may also determine corrective action to be taken with respect to processes or individual substrates based on the data. For example, the anomaly analysis engine 222 may identify a correlation between a measured anomaly associated with a temperature sensor correlated with a certain substrate parameter problem and a tool parameter, and determine that the tool parameter should be adjusted by a certain amount. Furthermore, the anomaly analysis engine 222 may determine actions to be performed on a substrate to bring one or more predicted parameters into an acceptable range (e.g., correcting overlay marks, stripping and recoating the substrate, and the like).

Predictive information regarding substrate quality with respect to parameters may permit personnel or MES 232 to improve the manufacturing process (e.g., lithography, etching, deposition, and planarization may be improved to achieve predictable properties).

Server 230 may comprise a computing device such as a rack server, desktop or laptop computer, mobile phone, tablet, or other suitable computing device. As shown, server 220 comprises an MES 232, which may perform operations described herein related to managing the manufacturing of silicon substrates. For example, MES 232 may coordinate processes performed by the manufacturing tools 101, and may collect data from these tools (e.g., tool parameters, thickness, optical reflective index, absorption index, strength, overlay and alignment data, critical dimension variation across the substrate, and the like) and time traces from sensors used by the manufacturing tools 101. In some embodiments, the data may be time-series traces which represent the behavior of sensors over time as manufacturing processes are performed. MES 232 may provide this information to the anomaly analysis engine 222 (e.g., over network 210), which may analyze the information and provide verification of the detection of anomalies. In some embodiments, the anomaly analysis engine 222 may provide instructions to MES 232 regarding corrective action to take with respect to an individual defect, the manufacturing tools 101, or other aspects of the manufacturing process. In certain embodiments, MES 232 automatically takes corrective action, such as by instructing individual sensors of individual chambers within the manufacturing tools 101 to perform certain tasks (e.g., instructing a lithography tool to strip and recoat a substrate in order to correct an alignment defect or instructing a deposition tool to alter one or more parameters).

The manufacturing tools 101 may comprise one or more tools which perform processes related to manufacturing silicon substrates. For example, the manufacturing tools 101 may include lithography tools, etching tools, deposition tools, and planarization tools. The manufacturing tools 101 may communicate with MES 232 in order to receive instructions and provide data from sensors within a particular tool (e.g., time-series data representing the values output by one or more sensors associate with of parameters of substrates captured by sensors over time during manufacturing).

Embodiments of the present disclosure employ an artificial neural network architecture known as a deep auto-encoder. Artificial neural networks are machine learning models inspired by the operating principles of the neural network of the human brain and have been widely applied to problems of classification and function approximation. Deep learning is part of a broader family of machine learning methods based on learning data representations, as opposed to task-specific algorithms. Deep learning is a class of machine learning algorithms that use a cascade of multiple layers of nonlinear processing units for feature extraction and transformation of input data. Each successive layer of the multiple layers uses the output from the previous layer as input. The multiple layers are then trained to learn a representation (encoding) of a set of input data, typically for the purpose of dimensionality reduction in an unsupervised (e.g., pattern analysis) manner.

A deep auto-encoder is a type of deep learning feed-forward neural network with one or more layers of hidden nodes, of which there are usually fewer nodes in successive layers than the input nodes in the encoding half and the decoding half usually has a structure that is mirror symmetric to the encoding half. The structure of the deep auto-encoder aids the embedded the neural network to learn the best representation of the input data corresponding to a set of training data derived from non-anomalous input sensor traces and to reconstruct the input data as output data corresponding to the input sensor traces. In one embodiment, the deep auto-encoder is trained with non-anomalous sensor trace runs to learn a minimum set of features necessary to reproduce the input sensor traces at an output of the deep auto-encoder minimizing reconstruction error. More specifically, the learning is the process of determining the connection weights between the layers such that performance is maximized when solving a learning problem. The representation is the normal signature of each of the sensor traces. Accordingly, the auto-encoder generates an output that is identical to the input.

Figure 3:
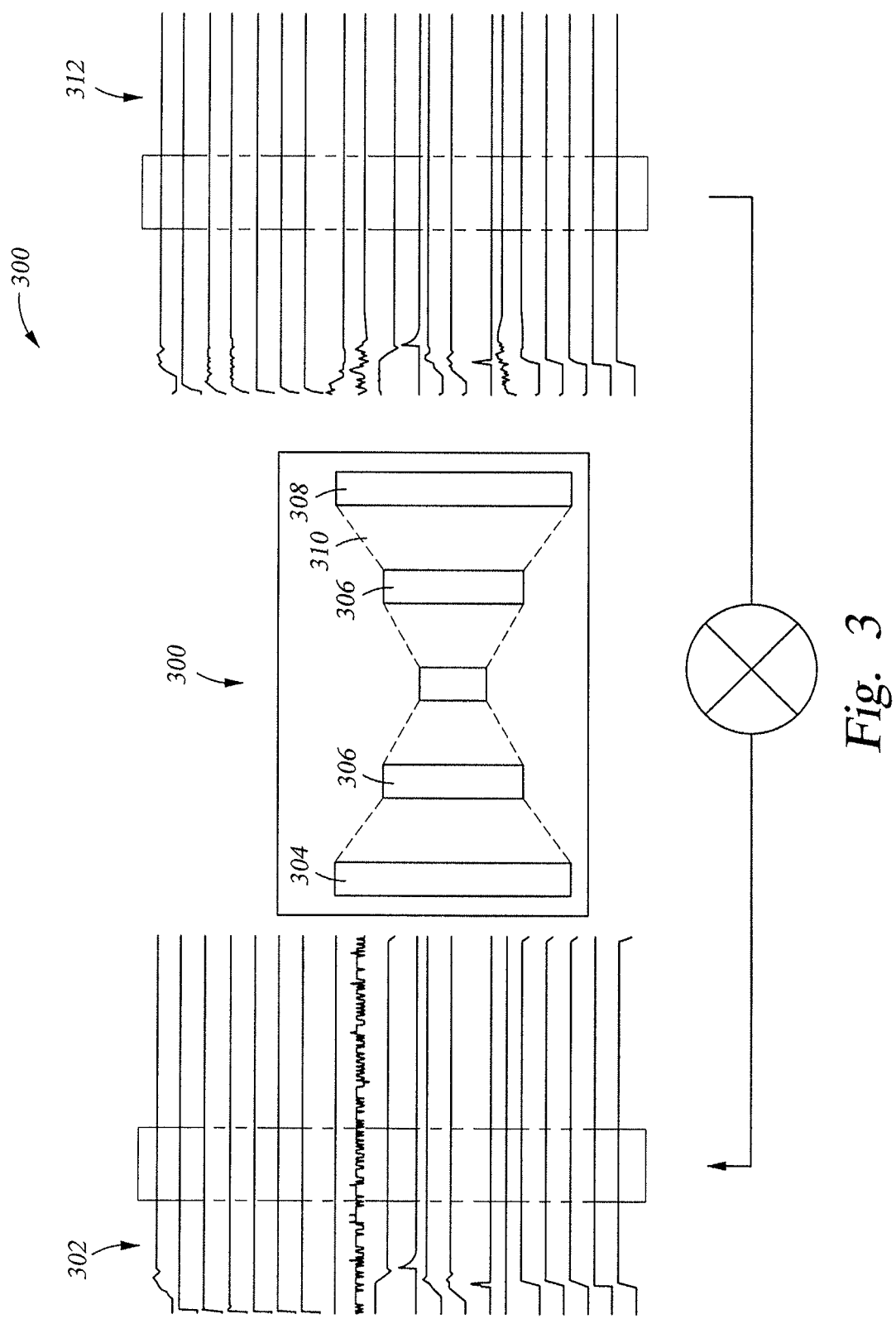
FIG. 3 illustrates a deep auto-encoder to be employed in embodiments of the present disclosure.

FIG. 3 illustrates a deep auto-encoder 300 to be employed in embodiments of the present disclosure. The input data 302 to the deep auto-encoder 300 comprises time slices of the sensor traces derived from a matrix representation of a plurality of time-series traces of a plurality of sensors associated with the manufacturing tools 101. The deep auto-encoder 300 may comprise an input layer 304, one or more hidden layers 306, a central bottleneck layer 308, an output layer 310, and a full set of connections 312 between the layers. The structure of the hidden layers 306 is symmetric with respect to the bottleneck layer 308, which has the smallest number of nodes. The bottleneck layer 308 is employed to help the neural network 300 find the minimal representation of the input data 302 reconstructed to the output data 314 by extracting a limited number of features that represent the input data 302. A designer only needs to define the number of layers in the deep auto-encoder 300, and how many nodes there are to be in each of the layers. The deep auto-encoder 300 is trained with example traces having no anomalies and is configured to produce output data 314 that is a reconstruction of the plurality of traces corresponding to the input data 302, wherein the output data 314 has minimized reconstruction error (e.g., the mean squared error, or MSE) relative to the input traces. The reconstruction error is minimized for a minimum set of the global and time invariant features learns by the deep-auto encoder 300 during training necessary to reproduce the input sensor traces.

Minimizing reconstruction error forces the deep auto-encoder 300 to engage in dimensionality reduction, for example, by learning how to identify the global and time invariant features of the input data 302 corresponding to the input traces. The deep auto-encoder 300 learns to compress data from the input layer 304 into a short code, and then un-compress that code into something that closely matches the original input data 302.

The deep auto-encoder 300 is trained before use on real data. The training algorithm for a deep auto-encoder can be summarized as follows: For each input x, do a feed-forward pass to compute activations at all hidden layers, then at the output layer to obtain an output x'; measure the deviation of x' from the input x that minimizes reconstruction error, e.g. mean squared error); and back propagate the error through the net and perform weight updates. Accordingly, the hidden nodes of the hidden layers 306 are trained to reconstruct the input x at the output x' by minimizing reconstruction error. As a result, the hidden nodes learn the global and time invariant features of the input traces necessary to reproduce the input traces. Minimizing the reconstruction error (e.g., the mean squared error, or MSE) yields a deep auto-encoder 300 that outputs the corresponding sensor signals.

Figure 4:
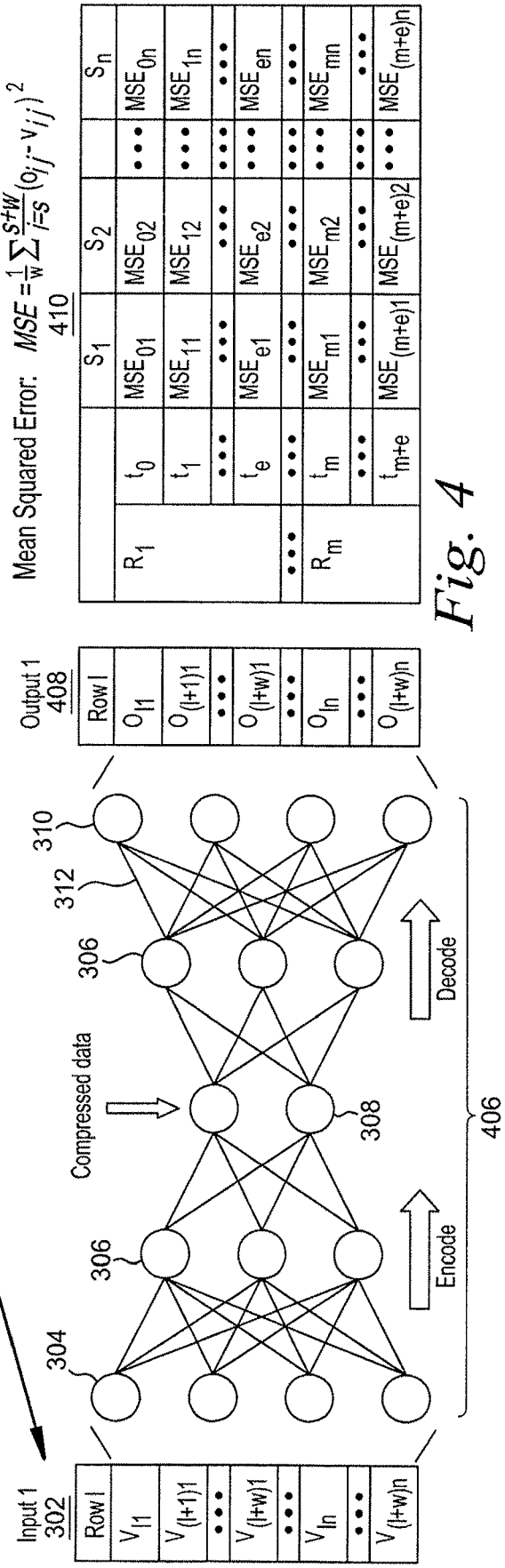
FIG. 4 shows the architecture of the deep auto-encoder in a modular fashion.

FIG. 4 shows the architecture 400 of the deep auto-encoder 300 in a modular fashion. The multiple sensor time-series traces needed to train the deep auto-encoder 300 or to test actual trace runs are preprocessed by the anomaly analysis engine 222 before being fed into the deep auto-encoder 300 contained within the anomaly analysis engine 222. Preprocessing includes normalizing each of the time-series traces to the range of [0,1] (min–max normalization, (x–min)/(max–min)). In deployment of the method, the min max value came from the training runs only. Preprocessing further includes extracting a plurality of rolling time windows 404 (sub-matrices) of each of the input time series traces at a plurality of timestamps from a matrix 402 comprising value/timestamp pairs of the input time-series traces from all of the sensors for all timestamps and feeding the plurality of rolling time windows 404 of value/timestamp data $V_{ij}$ as input data to the deep auto-encoder 300.

The matrix 402 has one dimension corresponding to trace point values $V_{ij}$ of sensor $S_1$ to $S_m$ from timestamp $t_0$ to $t_e$ of run/substrate $R_1$ to timestamp $t_m$ to $t_{m+e}$ of run/substrate $R_m$ as one dimension and sensors $S_1$ to $S_n$ as a second dimension. An input vector/sub-matrix containing a rolling time window 404 of the input data 302 from all of the sensors $S_i$ to $S_n$ at a plurality of instances of time $t_s$ to $t_{s+w}$ is extracted from the matrix 402.

From the plurality of rolling time windows 404, a row of values $V_{li}-V_{(l+w)1}$ to $V_{ln}-V_{(l+w)n}$ is fed by the anomaly analysis engine 222 into the deep auto-encoder 300. The minimal global and time invariant features set of the input trace data 302 is learned by the deep auto-encoder 300 by back-propagation and stochastic gradient descent based on the training (no fault) data. The nodes of the deep auto-encoder 304, 306, 308 encode the rolling window data 404, compress the rolling window data 404, and decode/decompress the rolling window data at nodes 308-312 to produce an output row of reconstructed input traces values as output trace values 408 for each time stamp ($O_{li}-O_{(l+w)1}$ to $O_{ln}-O_{(l+w)n}$. While testing, the whole chain of the nodes 406 in the layers 304-310 is operated in a feed-forward fashion in real-time and provides the RMS reconstruction error for a time window. The output data is an output vector 408 of data $O_{li}-O_{(l+w)1}$ to $O_{ln}-O_{(l+w)n}$ corresponding to the signatures of the input traces from all of the sensors.

In one embodiment, the deep auto-encoder 300 is trained with the normal runs using an optimizer. One such optimizer is an adaptive moment estimation (Adam) optimizer. An Adam optimizer is algorithm for first-order gradient-based optimization of stochastic objective functions, based on adaptive estimates of lower-order moments. The average reconstruction error (e.g., mean square error) of the time window over all sensors denotes how far the time window is from the nominal condition and is used as an anomaly indicator.

In other embodiments, other network structure hyperparameters may be employed based on: the number of layers, how many nodes are in each layer, the rolling window size, the activation function of the neural network, etc.

Once the minimal feature set is learned, an actual set of runs of time-series traces is fed to the deep-auto-encoder 300 which then produces output data 314 corresponding to minimum reconstruction error version of the input data 302 using the same rolling window technique and deep-auto-encoder 300 compression/decompression technique. The anomaly analysis engine 222 then calculates a mean squared error between the output data 408 ($O_{li}-O_{(l+w)1}$ to $O_{ln}-O_{(l+w)n}$) representing the reconstructed input data corresponding to the input time-series traces and the input data 302 ($V_{li}-V_{(l+w)n}$ to $V_{ln}-V_{(l+w)n}$) corresponding to the original time-series traces for each of the sensors of the plurality of sensors for the plurality of manufacturing tools 101. If any one reconstructed output time-series trace has a calculated mean square error that is larger than a predetermined threshold, then the corresponding input run/time-series trace is declared to be abnormal, and an anomaly for that time-series trace is detected.

The individual mean square error timestamp values $MSE_{ij}$ (410) contribute to the overall mean square error calculation. Suppose the input time series data is $v_1, v_2, \ldots, v_t$, then after the data is fit in the trained neural network model, the reconstructed output has the same dimension time series $o_1, o_2, \ldots, o_t$. The square reconstructed error $$MSE = \frac{1}{w}\sum_{i=s}^{s+w}(o_{ij} - v_{ij})^2$$

is then calculated. Each timestamp has a squared error value. A mean of the squared error within the window is taken as the anomaly score.

The mean of the squared error for each timestamp per run (or per step) can then be aggregated. If this mean squared error per run (or per step) is above certain threshold, then the run (or step) is declared to be an anomaly in a given sensor.

Figure 5:
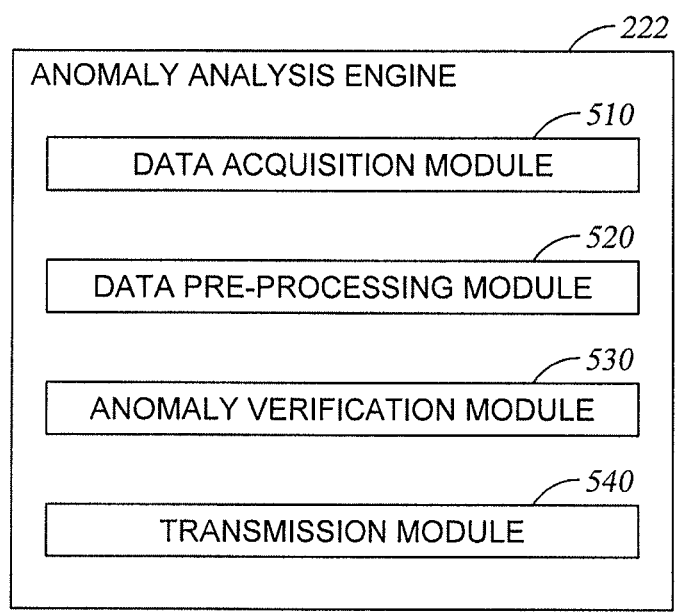
FIG. 5 illustrates components of an anomaly analysis engine according to embodiments of the present disclosure.

FIG. 5 illustrates components of anomaly analysis engine 222 according to embodiments of the present disclosure. As shown, the anomaly analysis engine 222 includes a data acquisition module 510, which may acquire data from MES 232 (e.g., over network 210). In alternative embodiments, data acquisition module 510 acquires time-series trace data directly from sensors within the manufacturing tools 101. The anomaly analysis engine 222 further includes a data pre-processing module 520, which may preprocess the time-series traces, time slices the traces, and feeds the time slices to the deep auto-encoder 300 according to the method described in FIG. 4. The anomaly analysis engine 222 further includes an anomaly verification module 530, which employs the deep auto-encoder 300 to determine whether there are any anomalies in the input time-series traces based on whether a mean square error between an output reconstructed time-series trace and a corresponding input time-series trace exceed a predetermined threshold and is thus an time-series trace containing an anomaly. The anomaly analysis engine 222 further includes a transmission module 540, which may transmit data such as sensor information and corrective instructions to MES 232 (e.g., over network 210) or to other destinations.

Figure 6:
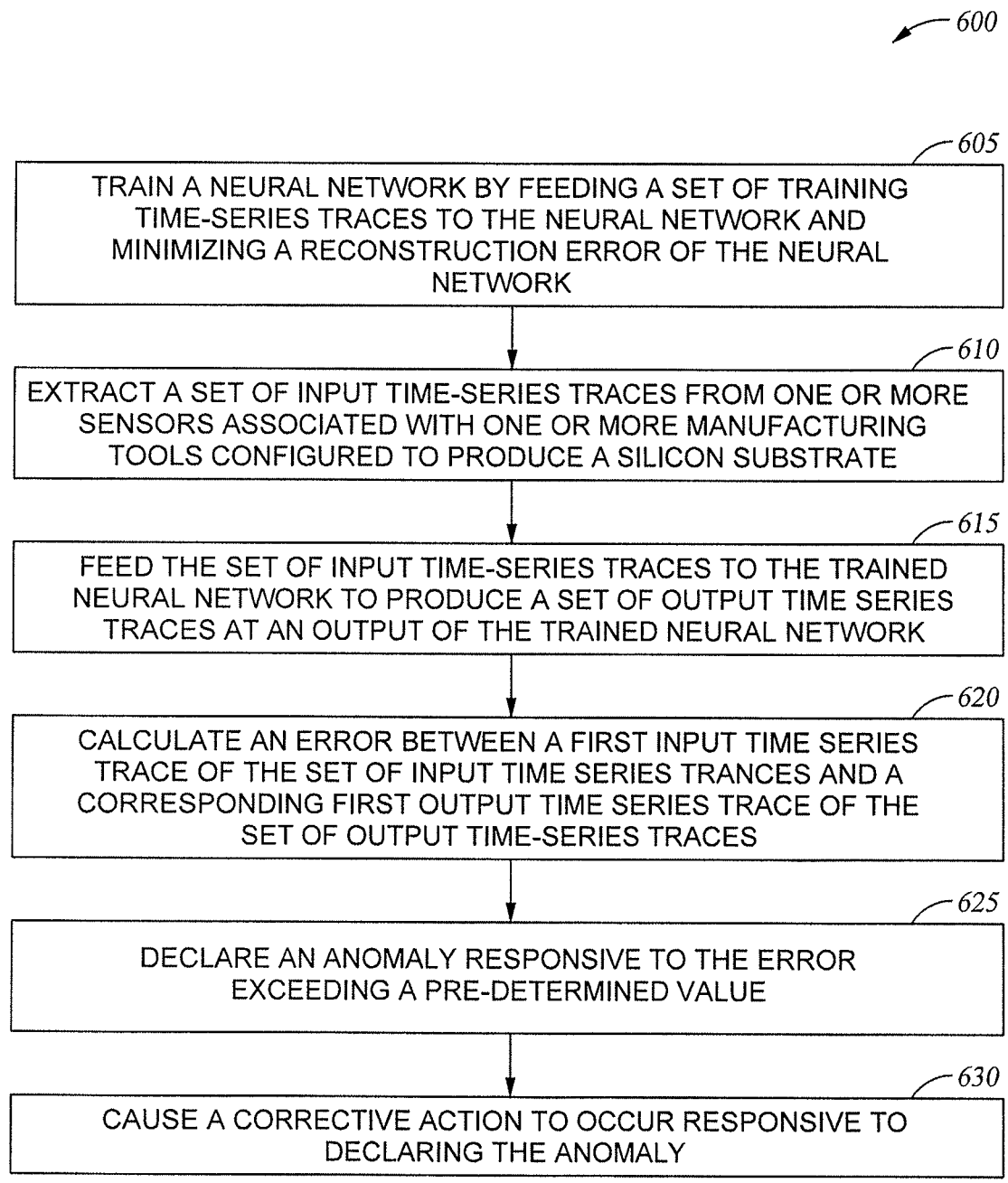
FIG. 6 illustrates one embodiment of a method for detecting anomalies in time-series data received from a plurality of sensors of the manufacturing tools.

FIG. 6 illustrates one embodiment of a method 600 for detecting anomalies in time-series data received from one or more sensors of the manufacturing tools 101. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the anomaly analysis engine 222 of FIG. 2.

At block 605, the anomaly analysis engine 222 feeds a set of training time-series traces to a neural network configured to derive a model of the training time-series traces that minimizes reconstruction error of the training time-series traces. At block 610, the anomaly analysis engine 222 extracts one or more input time-series traces from one or more sensors associated with one or more manufacturing tools 101 configured to produce a silicon substrate. Each of the input time-series traces are min-max normalized. Pre-processing further includes extracting an input time slice of each of the input time series traces at a moment in time from a matrix comprising time slices of the input time-series traces from all of the sensors for all moments in time of and feeding the time slice as input data to the deep auto-encoder 300. The anomaly analysis engine 222 further extracts an input vector from the matrix comprising a time slice of the input time-series traces from all of the sensors and feeds the time slice as input data to the neural network.

At block 615, the anomaly analysis engine 222 feeds the one or more input time-series traces to the trained neural network 300 to produce a set of output time series traces reconstructed based on the model. The neural network 300 is a deep learning, feed-forward, fully connected neural network. The neural network minimizes reconstruction error of the input time-series traces. Minimizing reconstruction error minimizes mean square error.

Nodes of the neural network 300 are organized into a plurality of layers. The plurality of layers comprises an input layer, an output layer, a central bottleneck layer, and one or more hidden layers disposed between the input layer and the output layer. The one or more hidden layers are trained to minimize reconstruction error. Nodes of the one or more hidden layers are trained to learn the global and time invariant features of the input time-series traces necessary to reconstruct the input time-series traces as the output time-series traces.

The neural network 300 is trained with normal time-series traces using an hyperparameter optimizer.

At block 620, the anomaly analysis engine 322 calculates a mean square error between each of the one or more output time-series traces and corresponding one or more input time-series traces. At block 625, the anomaly analysis engine 322 declares one or more sensors corresponding to the one or more input time-series traces as having an anomaly when the corresponding mean square error exceeds a pre-determined value. In one example, the pre-determined value may be set to the mean plus three sigma of the training reconstruction mean squared error as the cutoff.

At block 630, the anomaly analysis engine 322 instructs a manufacturing system to take corrective action to remove a cause of the declared anomaly.

Figure 7:
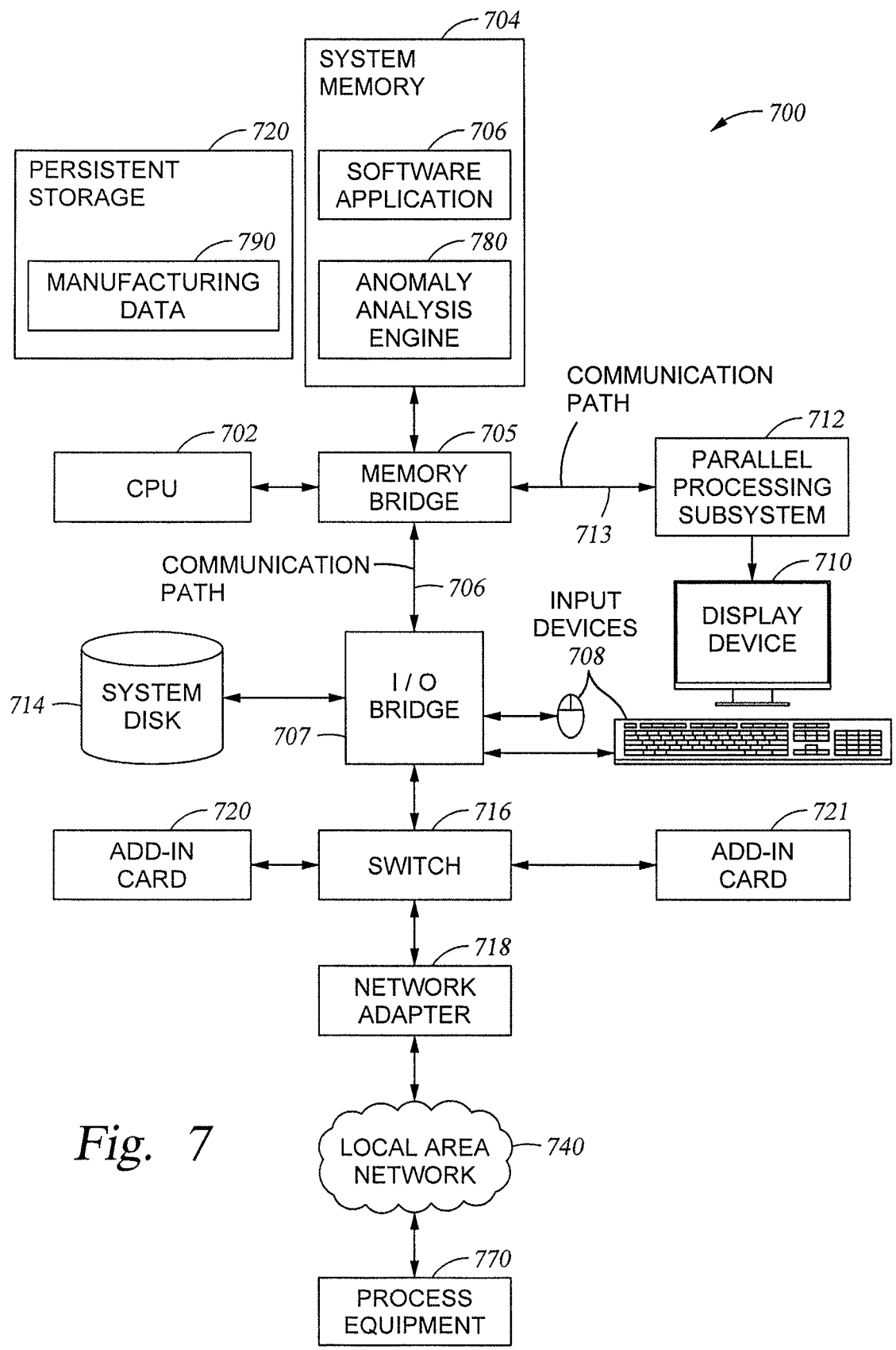
FIG. 7 depicts an example computer system with which embodiments of the present disclosure may be implemented.

FIG. 7 illustrates an example computing system 700 used to detect and analyze anomalies, according to some embodiments of the present disclosure. In certain embodiments, computer system 700 is representative of the server 120. Aspects of computer system 700 may also be representative of other devices used to perform techniques described herein (e.g., server 130). For example, computing system 700 may be a personal computer, industrial processor, personal digital assistant, mobile phone, mobile device or any other device suitable for practicing one or more embodiments of the present invention.

The system 700 includes a central processing unit (CPU) 702 and a system memory 704 communicating via a bus path that may include a memory bridge 705. CPU 702 includes one or more processing cores, and, in operation, CPU 702 is the master processor of the system 700, controlling and coordinating operations of other system components. System memory 704 stores a software application 706, and data, for use by CPU 702. CPU 702 runs software applications and optionally an operating system.

Illustratively, the system memory 704 includes the anomaly analysis engine 780, which may correspond to the anomaly analysis engine 222, which performs operations related to detecting sensor anomalies, according to techniques described herein. For example, the anomaly analysis engine 780 may be equivalent to the anomaly analysis engine 222 in FIG. 2, and may employ a deep auto-encoder type neural network 300 that reconstructs one or more input time-series traces as corresponding one or more output time-series traces based on a model which minimizes reconstruction error of training time-series traces, and, based on that set, detects and verifies sensor anomalies and other aspects of the manufacturing process.

Memory bridge 705, which may be, e.g., a Northbridge chip, is connected via a bus or other communication path (e.g., a HyperTransport link) to an I/O (input/output) bridge 707. I/O bridge 707, which may be, e.g., a Southbridge chip, receives user input from one or more user input devices 708 (e.g., keyboard, mouse, joystick, digitizer tablets, touch pads, touch screens, still or video cameras, motion sensors, and/or microphones) and forwards the input to CPU 702 via memory bridge 705.

A display processor 712 is coupled to the memory bridge 785 via a bus or other communication path (e.g., a PCI Express, Accelerated Graphics Port, or HyperTransport link); in one embodiment display processor 712 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 704.

Display processor 712 periodically delivers pixels of the dashboard to a display device 710 (e.g., a screen or conventional CRT, plasma, OLED, SED or LCD based monitor or television). Additionally, display processor 712 may output pixels to film recorders adapted to reproduce computer generated images on photographic film. Display processor 712 can provide display device 710 with an analog or digital signal.

Persistent storage 720 is also connected to I/O bridge 707 and may be configured to store content and applications and data, such as a database library 715, for use by CPU 702 and display processor 712. Persistent storage 720 provides non-volatile storage for applications and data and may include fixed or removable hard disk drives, flash memory devices, and CD-ROM, DVD-ROM, Blu-ray, HD-DVD, or other magnetic, optical, or solid state storage devices.

Illustratively, persistent storage 720 includes manufacturing data 790, which may comprise information acquired by the anomaly analysis engine 222. Manufacturing data 790 may, for example, comprise information received from MES 232, collected by the manufacturing tools 101, related to various sensors taking measurements from substrates and tools over time during the manufacturing processes.

A switch 716 provides connections between the I/O bridge 707 and other components such as a network adapter 718 and various add-in cards 720 and 7721. Network adapter 718 allows the system 700 to communicate with other systems via an electronic communications network, and may include wired or wireless communication over local area networks 740 and wide area networks such as the Internet.

Other components (not shown), including USB or other port connections, film recording devices, or other suitable computing device, may also be connected to I/O bridge 707. For example, process equipment 770 may operate from instructions and/or data provided by CPU 702, system memory 704, or persistent storage 720. Communication paths interconnecting the various components in FIG. 7 may be implemented using any suitable protocols, such as PCI (Peripheral Component Interconnect), PCI Express. (PCI-E), AGP (Accelerated Graphics Port), HyperTransport, or any other bus or point-to-point communication protocol(s), and connections between different devices may use different protocols, as is known in the art.

The process equipment 770 may be one or more semiconductor chambers such as a plasma enhanced chemical vapor deposition (PECVD) or other plasma processing tool, such as the processing tools contained in the manufacturing tools 101. For example, process equipment 270 may be an etch chamber, a chemical vapor deposition chamber, a physical vapor deposition chamber, an implant chamber, a plasma treatment chamber, or other plasma processing chamber, either alone or in combination with one or more other chambers.

In one embodiment, display processor 712 incorporates circuitry optimized for performing mathematical operations, including, for example, math co-processor, and may additionally constitute a graphics processing unit (GPU). In another embodiment, display processor 712 incorporates circuitry optimized for general purpose processing. In yet another embodiment, display processor 712 may be integrated with one or more other system elements, such as the memory bridge 705, CPU 702, and I/O bridge 707 to form a system on chip (SoC). In still further embodiments, display processor 712 is omitted and software executed by CPU 702 performs the functions of display processor 712.

Pixel data can be provided to display processor 712 directly from CPU 702. In some embodiments, instructions and/or data representing an anomaly verification analysis is provided to set of server computers, each similar to the system 700, via network adapter 718 or system disk 714. The servers may perform operations on subsets of the data using the provided instructions for analysis. The results from these operations may be stored on computer-readable media in a digital format and optionally returned to the system 700 for further analysis or display. Similarly, data may be output to other systems for display, stored in a database library 715 on the system disk 714, or stored on computer-readable media in a digital format.

Alternatively, CPU 702 provides display processor 712 with data and/or instructions defining the desired output images, from which display processor 712 generates the pixel data of one or more output images, including characterizing and/or adjusting the offset between stereo image pairs. The data and/or instructions defining the desired output images can be stored in system memory 804 or graphics memory within display processor 712. CPU 702 and/or display processor 712 can employ any mathematical, function or technique known in the art to create one or more results from the provided data and instructions, including running models and comparing data from sensors to track the service life of chamber components.

It will be appreciated that the system shown herein is illustrative and that variations and modifications are possible. The connection topology, including the number and arrangement of bridges, may be modified as desired. For instance, in some embodiments, system memory 704 is connected to CPU 702 directly rather than through a bridge, and other devices communicate with system memory 704 via memory bridge 705 and CPU 702. In other alternative topologies display processor 712 is connected to I/O bridge 807 or directly to CPU 702, rather than to memory bridge 705. In still other embodiments, I/O bridge 707 and memory bridge 705 might be integrated into a single chip. The particular components shown herein are optional; for instance, any number of add-in cards or peripheral devices might be supported. In some embodiments, the process equipment 770 may be connected directly to the I/O bridge 707. In some embodiments, the switch 816 is eliminated, and the network adapter 718 and the add-in cards 720, 721 connect directly to the I/O bridge 707.

Various embodiments of the invention may be implemented as a program product for use with a computer system. The software routines of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Any combination of one or more computer readable medium(s) may be utilized for storing a program product which, when executed, is configured to perform method for determining the service life of a chamber components. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Advantageously, the techniques presented herein allow for real-time anomaly detection, off-line problem diagnosis, and chamber matching. With respect to real-time anomaly detection, embodiments train a model beforehand, and-real time detects whether there is a large deviation from a good trace and whether to make a correction accordingly. With respect to off-line problem diagnosis, when certain problem happens during a marathon of runs, embodiments use good runs to train a model and check the difference of a bad run compared to the good run. This determines the top contributor sensors of the difference to help diagnose what is the real problem in either hardware or the process itself (e.g., a flow valve, power strike delayed, etc.). With respect to chamber matching, embodiments permit training the model with multiple runs from one/multiple good chambers, and checking differences in output traces from a good chamber but coming from a bad chamber. As stated above, the autoencoder will ignore the baseline difference between good chambers, and focus on finding the more important differences (e.g., pattern, process, etc.). This is more efficient than conventional methods for chamber matching that run the same/similar recipe.

The techniques allow for intelligent predictions of substrate quality based on manufacturing data, and allow for efficient decisions to be made regarding corrective actions to be taken with respect to individual substrates and other aspects of the manufacturing process. Use of embodiments of the present disclosure may reduce costs, improve efficiency, and allow for better strategic planning with respect to the manufacturing process.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may be referred to herein as a "circuit," "module" or "system." Furthermore, aspects of the present invention may take the form of a computer program product embodied in one or more computer readable medium(s) having computer readable program code embodied thereon.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present disclosure, other and further embodiments of the disclosure may be devised without departing from the basic scope thereof, and the scope thereof is determined by the claims that follow.

The invention claimed is:

1. A method for detecting anomalies in time-series traces received from sensors of manufacturing tools, comprising:
   feeding a set of training time-series traces to a neural network configured to derive a model of the training time-series traces that minimizes reconstruction error of the training time-series traces;
   extracting a set of input time-series traces from one or more sensors associated with one or more manufacturing tools configured to produce a silicon substrate;
   feeding the set of input time-series traces to the trained neural network to produce a set of output time series traces reconstructed based on the model;
   calculating a mean square error between a first input time series trace of the set of input time series traces and a corresponding first output time series trace of the set of output time-series traces; and
   declaring the sensor corresponding to the first input time-series trace as having an anomaly when the mean square error exceeds a pre-determined value.

2. The method of claim 1, further comprising instructing a manufacturing system to take corrective action to remove a source of the anomaly.

3. The method of claim 1, wherein the neural network is a deep learning, feed-forward, fully connected neural network.

4. The method of claim 1, wherein minimizing reconstruction error minimizes mean square error between training time-series traces fed to the neural network and the model of the training time series traces.

5. The method of claim 1, wherein nodes of the neural network are organized into a plurality of layers.

6. The method of claim 5, wherein the plurality of layers comprises an input layer, an output layer, a central bottleneck layer, and one or more hidden layers disposed between the input layer and the output layer.

7. The method of claim 6, wherein the one or more hidden layers are trained to minimize reconstruction error.

8. The method of claim 6, wherein nodes of the one or more hidden layers are trained to learn the global and time invariant features of the training time-series traces necessary to reconstruct the training time-series traces.

9. The method of claim 1, wherein the neural network is trained using normal time-series traces using a hyperparameter optimizer.

10. The method of claim 1, further comprising:
    extracting an input time slice of each of the input time series traces at a moment in time from a matrix comprising time slices of the input time-series traces from all of the sensors for all moments in time of; and
    feeding the time slice as input data to the neural network.

11. A computing system, comprising:
    a memory; and
    a processor configured to perform a method for detecting anomalies in time-series traces received from sensors of manufacturing tools, the method comprising:
       feeding a set of training time-series traces to a neural network configured to derive a model of the training time-series traces that minimizes reconstruction error of the training time-series traces;
       extracting a set of input time-series traces from one or more sensors associated with one or more manufacturing tools configured to produce a silicon substrate;
       feeding the set of input time-series traces to the trained neural network to produce a set of output time series traces reconstructed based on the model;
       calculating a mean square error between a first input time series trace of the set of input time series traces and a corresponding first output time series trace of the set of output time-series traces; and
       declaring the sensor corresponding to the first input time-series trace as having an anomaly when the mean square error exceeds a pre-determined value.

12. The computing system of claim 11, further comprising instructing a manufacturing system to take corrective action to remove a source of the anomaly.

13. The computing system of claim 11, wherein the neural network is a deep learning, feed-forward, fully connected neural network.

14. The computing system of claim 11, wherein minimizing reconstruction error minimizes mean square error between training time-series traces fed to the neural network and the model of the training time series traces.

15. The computing system of claim 11, further comprising:
    extracting an input time slice of each of the input time series traces at a moment in time from a matrix comprising time slices of the input time-series traces from all of the sensors for all moments in time of; and
    feeding the time slice as input data to the neural network.

16. A non-transitory computer-readable medium comprising instructions that when executed by a computing device cause the computing device to perform a method for detecting anomalies in time-series traces received from sensors of manufacturing tools, the method comprising:
    feeding a set of training time-series traces to a neural network configured to derive a model of the training time-series traces that minimizes reconstruction error of the training time-series traces;
    extracting a set of input time-series traces from one or more sensors associated with one or more manufacturing tools configured to produce a silicon substrate;
    feeding the set of input time-series traces to the trained neural network to produce a set of output time series traces reconstructed based on the model;
    calculating a mean square error between a first input time series trace of the set of input time series traces and a corresponding first output time series trace of the set of output time-series traces; and
    declaring the sensor corresponding to the first input time-series trace as having an anomaly when the mean square error exceeds a pre-determined value.

17. The non-transitory computer-readable medium of claim 16, further comprising instructing a manufacturing system to take corrective action to remove a source of the anomaly.

18. The non-transitory computer-readable medium of claim 16, wherein the neural network is a deep learning, feed-forward, fully connected neural network.

19. The non-transitory computer-readable medium of claim 16, wherein minimizing reconstruction error minimizes mean square error between training time-series traces fed to the neural network and the model of the training time series traces.

20. The non-transitory computer-readable medium of claim 16, further comprising:
    extracting an input time slice of each of the input time series traces at a moment in time from a matrix comprising time slices of the input time-series traces from all of the sensors for all moments in time of; and
    feeding the time slice as input data to the neural network.

21. The method of claim 1 further comprising:
    preprocessing the set of training time-series traces, wherein the preprocessing of the set of training time-series traces includes normalizing the training time-series data traces based only on the training time-series traces.

* * * * *